(12) United States Patent
Brady et al.

(10) Patent No.: US 6,943,304 B1
(45) Date of Patent: Sep. 13, 2005

(54) FISH PROTECTING COVERS FOR FISH WEIGHING DEVICE JAWS

(75) Inventors: Robert Brady, Sarasota, FL (US); Dale Thomas Walker, Palm Harbor, FL (US); Richard Herbst, Sarasota, FL (US)

(73) Assignee: Role Associates LLC, Bradenton, FL (US)

(*) Notice: Subject to any disclaimer, the term of this patent is extended or adjusted under 35 U.S.C. 154(b) by 237 days.

(21) Appl. No.: 10/645,897

(22) Filed: Aug. 21, 2003

Related U.S. Application Data (63) Continuation-in-part of application No. 10/194,384, filed on Jul. 12, 2002, now Pat. No. 6,696,650.

(51) Int. Cl.[7] .................. G01G 21/00; A01K 97/14
(52) U.S. Cl. .............................. 177/148; 43/5
(58) Field of Search .................. 177/131, 148, 177/149; 43/5

(56) References Cited

U.S. PATENT DOCUMENTS

| | | | | |
|---|---|---|---|---|
| 3,743,042 A | * | 7/1973 | Hilterhaus | 177/233 |
| 3,848,689 A | * | 11/1974 | Hilterhaus | 177/233 |
| 5,031,710 A | * | 7/1991 | Parker et al. | 177/210 FP |
| 5,119,585 A | * | 6/1992 | Camp | 43/53.5 |
| 5,253,557 A | * | 10/1993 | Dolak | 81/427.5 |
| 5,987,808 A | * | 11/1999 | Coles | 43/55 |
| 6,560,913 B1 | * | 5/2003 | Liao | 43/5 |
| 6,696,650 B2 | * | 2/2004 | Muller et al. | 177/148 |
| 6,857,217 B1 | * | 2/2005 | Herbst et al. | 43/5 |

* cited by examiner

*Primary Examiner*—Randy W. Gibson
(74) *Attorney, Agent, or Firm*—Charles J. Prescott

(57) ABSTRACT

For an electronic fish scale including a molded housing having upper and lower portions for supported hand grasping and a pair of opposed C-shaped jaws which open when a jaw actuator is manually moved upwardly to receive a lower lip of a fish securely held and unhurt between the jaws when closed for weighing the fish, a jaw tip cover for the lower distal end portion of each jaw half. The jaw tips or GRIP SOCKS are over-molded of resistant plastic material to enhance gripability of fish lips and to reduce harm to the fish when released.

3 Claims, 10 Drawing Sheets

FISH PROTECTING COVERS FOR FISH WEIGHING DEVICE JAWS

CROSS-REFERENCE TO RELATED APPLICATIONS

This is a continuation-in-part of application Ser. No. 10/194,384 filed Jul. 12, 2002, now U.S. Pat. No. 6,696,650.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

The present invention is generally directed to fish-handling equipment, and more particularly to a fish scale which includes pivotally moveable opposing jaws, the distal lower ends of which are covered with textured molded GRIP SOCKS which engage the lower lip of the fish for better retention during weighing and without harm to the fish.

2. Description of Related Art

For the more serious fishermen and in tournament competition, the ability to catch, weigh and release fish unharmed should be facilitated by fish-handling tools for this purpose. Once a fish is caught and landed, the precise weighing of the fish and the recordation of data is best accomplished with a fishing tool which does not injure the fish so that it may be returned to the sea.

One such device known to applicant was invented by Camp and is disclosed in U.S. Pat. No. 5,119,585 and currently marketed under the trademark BOGAGRIP. This patent teaches a fish-handling tool having a complex structure which causes opposing jaws to pivotally move from an automatically locked closed position wherein the distal lower ends of the jaws touch one another to an open position wherein the lower lip of a fish may be positioned therebetween, after which the releasing of a longitudinal actuator of the device causes the jaws to re-close on the lower lip. Thereafter, the Camp device is provided with a conventional tubular spring scale with incremental readings for fish weight inscribed along an inner tubular member within the handle. However, this device has no means for the accurate digital reading of fish weight and has no provision for the storing of data with respect to each fish caught and weighed. Moreover, it is not buoyant.

In U.S. Pat. No. 5,031,710, Parker teaches an electronic fish scale which utilizes the linear displacement of a spring along a variable resister to provide an electrical signal in proportion to the amount of weight of the fish hung therefrom. A pair of fish-handling pliers is disclosed in U.S. Pat. No. 6,256,923 invented by Norton which is structured similar to that of a conventional pair of Vice Grips having spaced jaws which come together over the lower lip of the fish, presumably without harming the fish.

A fish stringer with floating weight indicator is disclosed by Coles in U.S. Pat. No. 5,987,808. This invention, which does not weigh a fish, is generally directed to a conventional fish stringer having an openable hook attached to one end and a floating weight indicating device attached to the other end of the elongated flexible cord. Although this device does not actually weigh a fish, it includes rotatable discs each bearing numerical indicia which may be positioned to indicate the weight of the fish before it is placed in a live fish well. The fisherman may then easily observe the weights of all of the fish in the well by simply looking at each of the floating weight indicating devices attached to the corresponding fish.

The present invention provides a fish scale which incorporates all of the benefits of the above prior art with the addition of several added features. A simplistic, yet effective design for opposing c-shaped openable jaws is also provided for harmlessly engaging the lower lip of a fish while being weighed by the device. Molded resilient plastic covers ("GRIP SOCKS") for the distal end portions of each jaw for enhanced grippability and protection from harming the mouth of the fish are also provided. Moreover, the housing is ergonomically configured to facilitate hand holding of the device while the jaws are opened and closed and while the fish is being held for weighing therefrom. An aperture is also provided to attach the device either to a rope or hook to facilitate fish weighing.

BRIEF SUMMARY OF THE INVENTION

This invention is directed to an electronic fish scale including a molded housing having upper and lower portions for supported hand grasping and a pair of opposed C-shaped jaws which open when a jaw actuator is manually moved upwardly to receive a lower lip of a fish securely held and unhurt between the jaws when closed for weighing the fish, a jaw tip cover for the lower distal end portion of each jaw half. The jaw tips or GRIP SOCKS are over-molded of resistant plastic material to enhance gripability of fish lips and to reduce harm to the fish when released.

It is therefore an object of this invention to provide a fish scale which is easily portable and hand-holdable during both fish engaging and fish weighing procedures.

It is another object of this invention to provide a fish scale having multi-function digital display screen and pivotally openable jaws which are harmlessly engagable with the lower lip of a fish.

Still another object of this invention in its preferred embodiment is to provide a buoyant fish scale with non-harmful jaws which harmlessly engage the lower lip of a fish and which provides a multi-function digital L.C.D. readout display.

Still another object of this invention is to provide a fish scale which is ergonomically configured and surface textured to enhance gripability so that larger fish may be manually weighed without the need of attaching the device to a hook or a rope.

In accordance with these and other objects which will become apparent hereinafter, the instant invention will now be described with reference to the accompanying drawings.

DETAILED DESCRIPTION OF THE INVENTION

Figure 3:
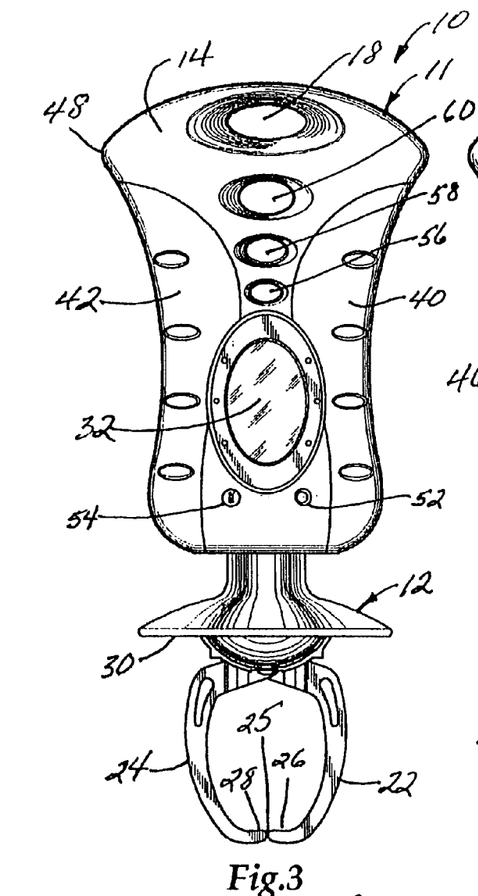
FIG. 3 is a front elevation view of the invention.
Figure 4:
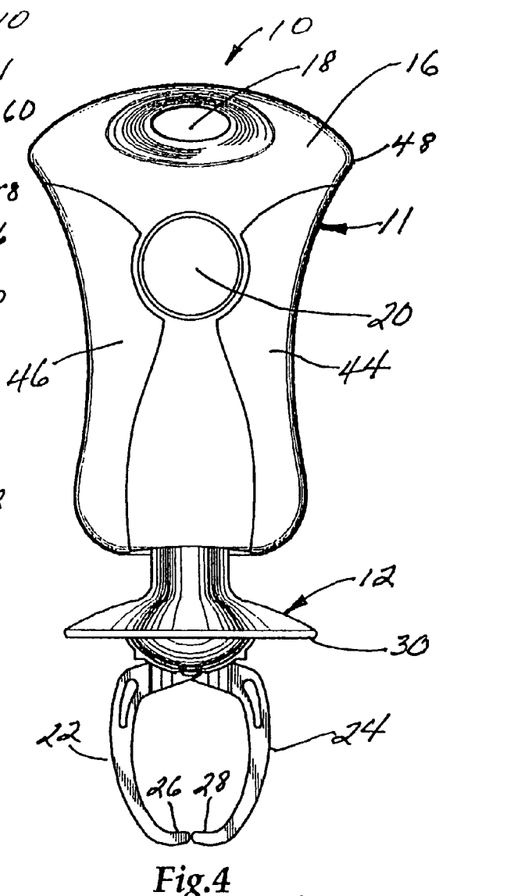
FIG. 4 is a rear elevation view of the invention.
Figure 5:
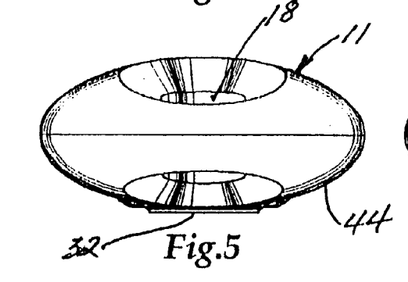
FIG. 5 is a top plan view of the invention.
Figure 6:
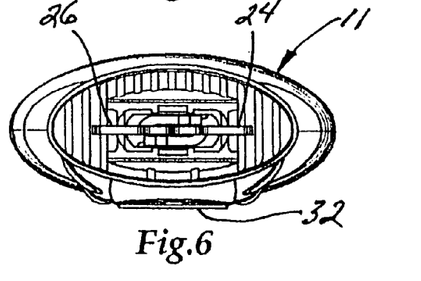
FIG. 6 is a bottom plan view of the invention.

Referring now to the drawings and particularly to FIGS. 1 to 8, the invention is there shown generally at numeral 10 and includes a molded plastic housing 11 formed of thin-wall molded ASA plastic in two halves 14 and 16. The fish scale 10 of the present invention also includes a fish-engaging assembly shown generally at numeral 12 also shown in FIG. 11 which includes a pair of identical jaws 22 and 24 having lower distal portions 26 and 28 which meet at a center point 25 along the longitudinal axis of the device 10. As best seen in FIGS. 3 and 4, each of the jaws 22 and 24 are generally c-shaped with an upwardly extending leg portion 22a and 24a which is best seen in FIG. 9.

Figures 1, 2:
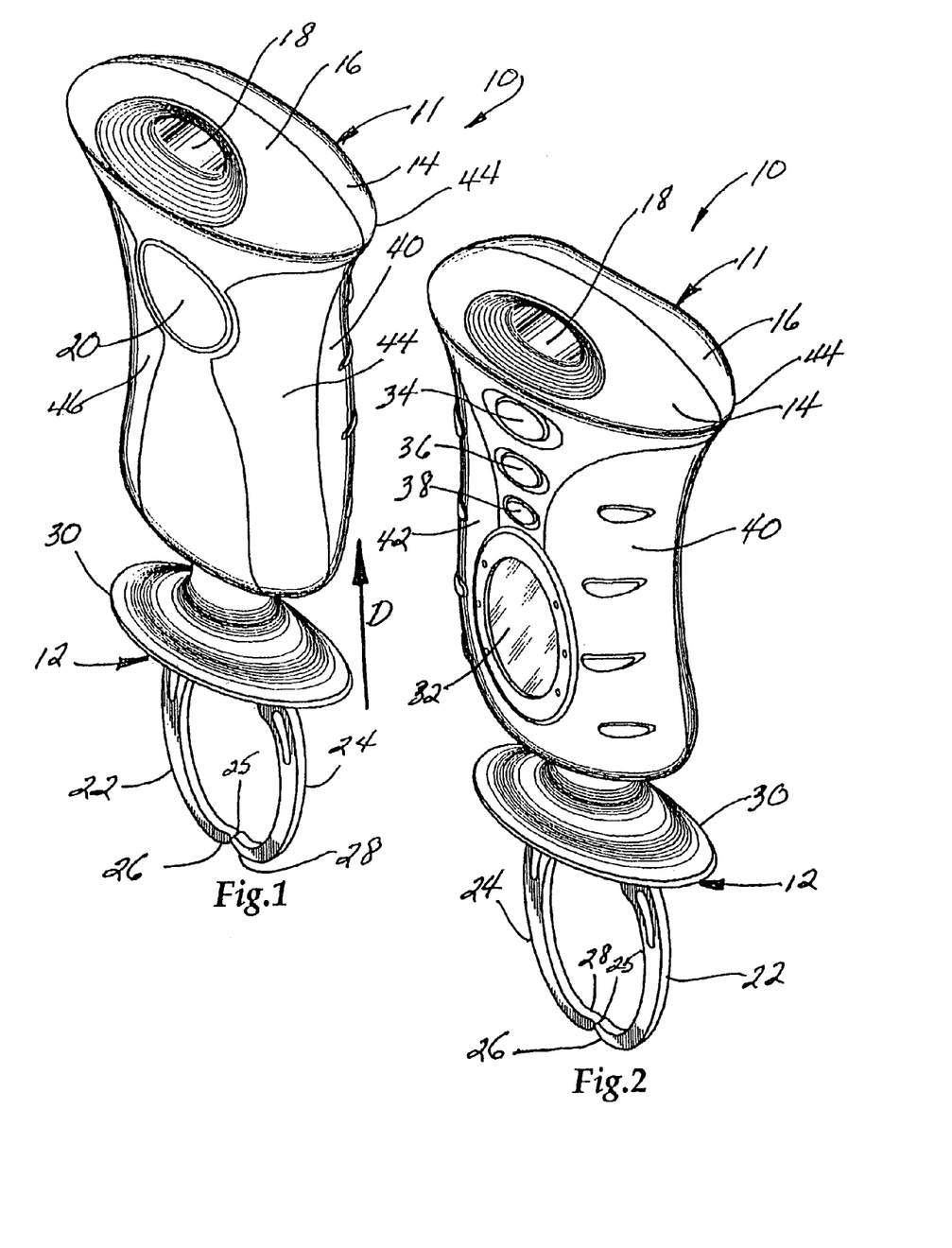
FIG. 1 is a rear perspective view of the invention.
FIG. 2 is a front elevation view of the invention.

The front half 14 of the housing 11 as seen in FIGS. 2 and 3, includes an opening through which a display (L.C.D.) panel or screen 32 may be viewed. A plurality of control buttons are also provided whereby, at button 56, the device 10 may be activated and re-zeroed by sequentially pressing this button 56. Button 58 provides memory recall for data stored in the electronic circuit of the invention described herebelow, while button 60 will actually affect storage of the current data shown during on the digital screen 32 as a fish is being weighed. Button 52 provides a clearing of memory, while toggle 54 allows the device 10 to operate in either a metric mode or a U.S. mode of weight measurement.

An aperture 18 is formed transversely front-to-back through the upper portion of the housing and both of its halves 14 and 16 which may be used for hanging the device 10 from a hook or a flexible rope or line which is attached to an overhead support.

The jaw actuating assembly 12 includes a flared molded plastic jaw actuator 30 which, when moved by finger or thumb pressure against the lower surface thereof, will cause it to move upwardly in the direction of arrow D. The internal mechanism for accomplishing the opening of the jaws 22 and 24 by this movement of the jaw actuator 30 will be described in more detail herebelow.

Figure 9:
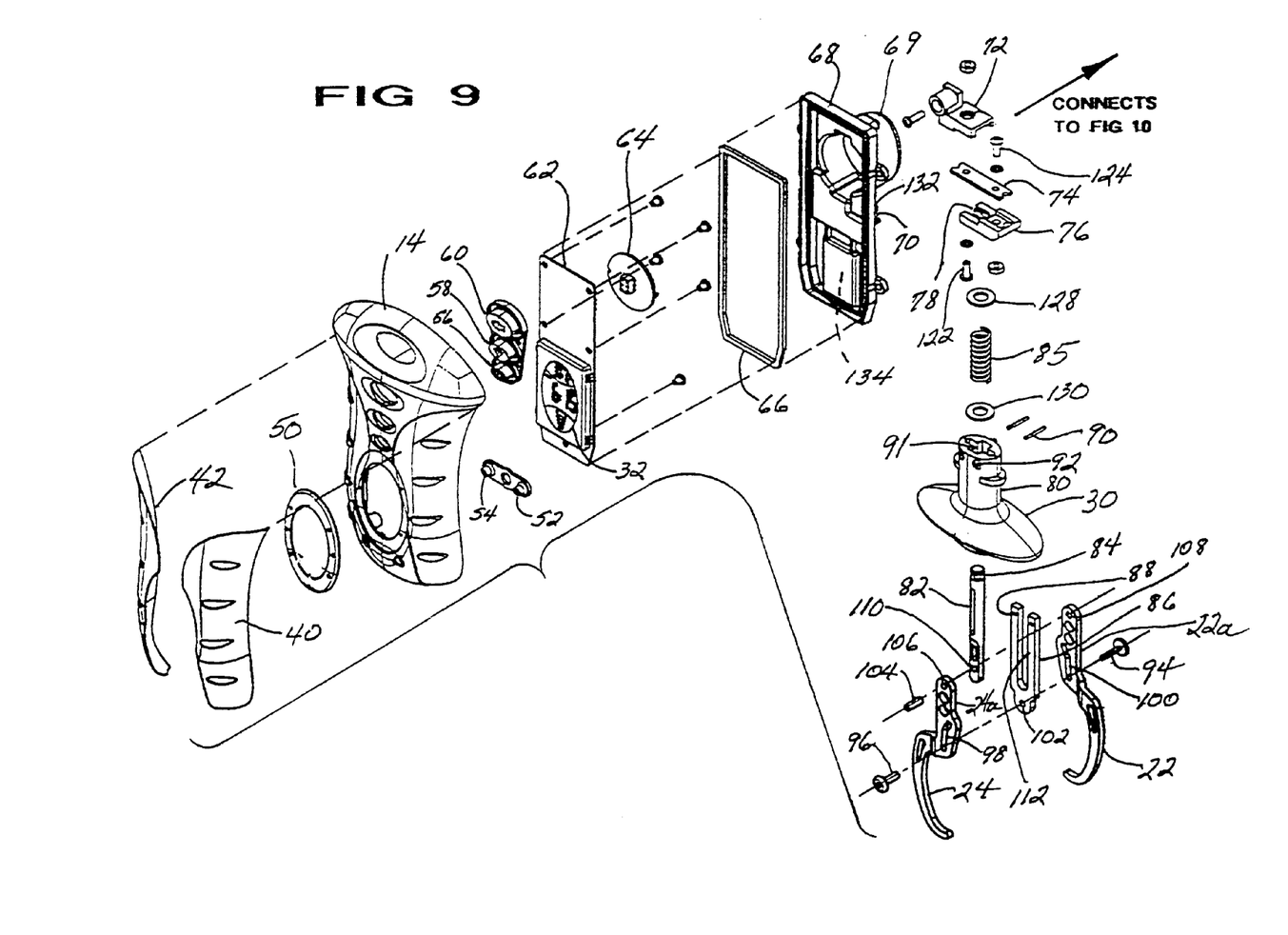
FIG. 9 is an exploded perspective view of a portion of the invention which is connected to and continues with the other portion thereof on in FIG. 10.
Figure 10:
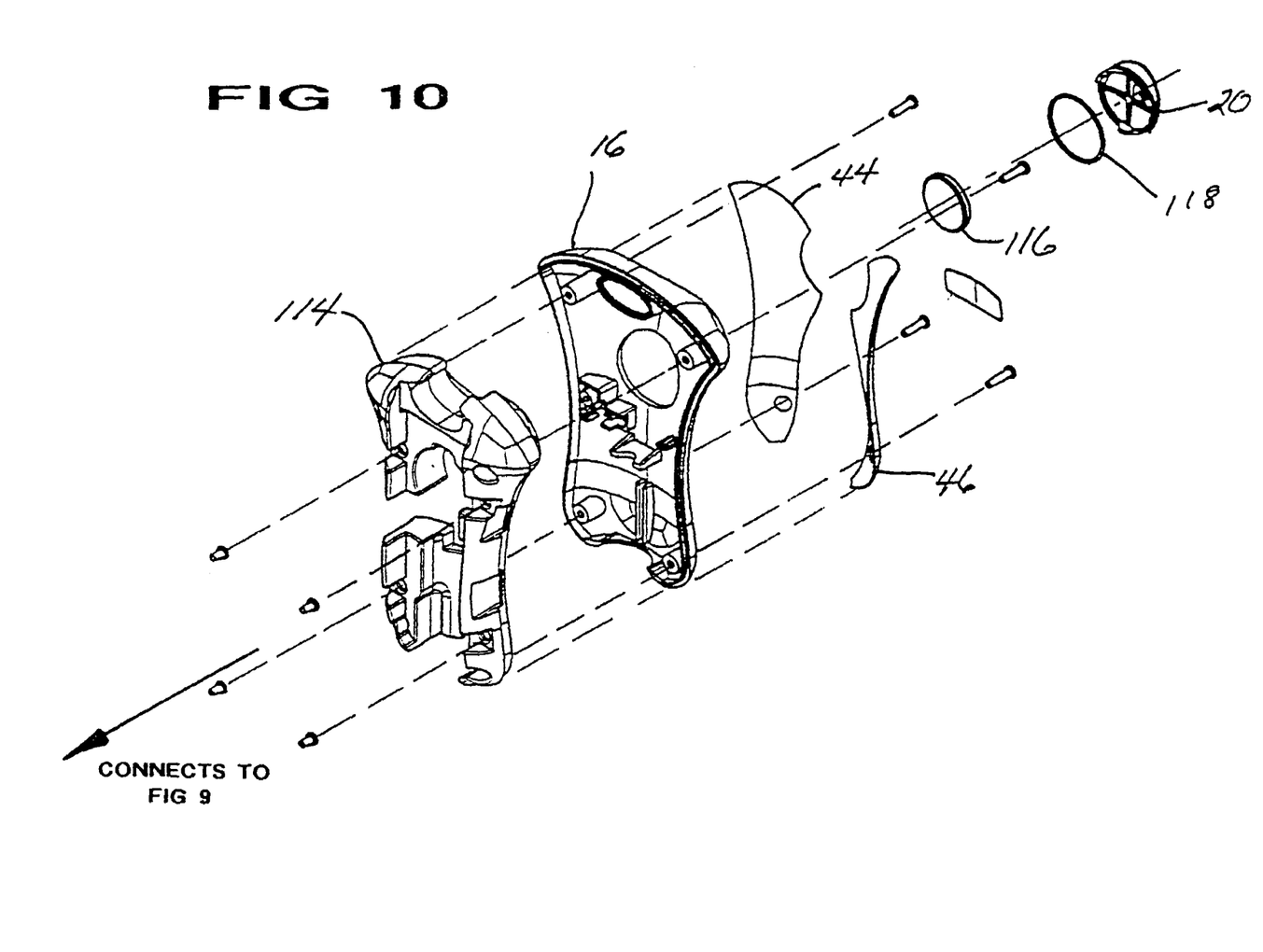
FIG. 10 is an exploded perspective view of the other portion of the invention which is connected to and continues from in FIG. 9.

A battery cover 20 which is threadably disengagable for battery replacement is also provided and which is sealably engaged into cavity 69, the rear housing half 16 as seen in FIG. 9 by an o-ring 118 surrounding the perimeter of the battery cap 20 which holds a lithium ion battery 116 as best seen in FIG. 10.

Figure 7:
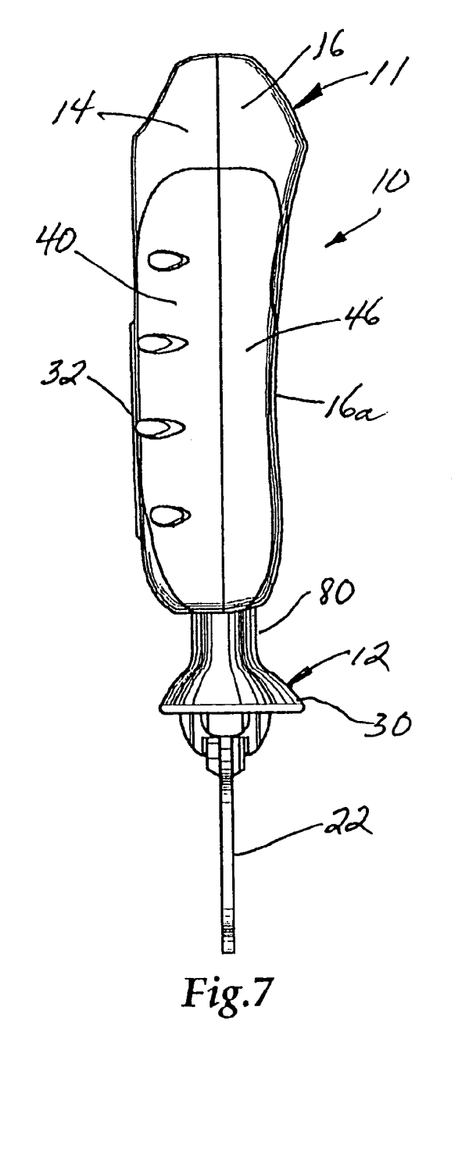
FIG. 7 is a right side elevation view of the invention.
Figure 8:
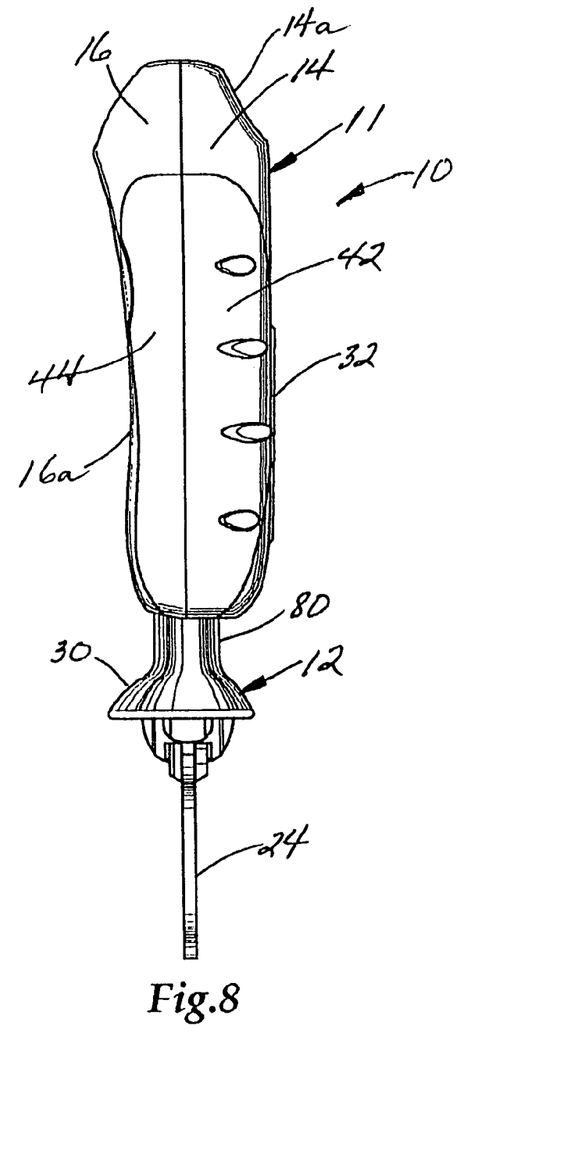
FIG. 8 is a left side elevation view of the invention.

The housing 11 of the device 10 is ergonomically configured as best seen in FIGS. 3, 4, 7 and 8 such that the upper portion of the housing is enlarged at 48 and having a central housing portion which is at its narrowest girth and width, enlarging slightly toward the lower portion of the housing. This configuration, particularly the enlarged upper portion 48, greatly enhances the ease with which the device 10 may be hand-held in one hand while finger or thumb grasping of the jaw actuator 30 to effect opening and closing of the jaws 22 and 24 as desired. Note further that, as best seen in FIGS. 7 and 8, the side profile 16a of the rear housing half 16 is concaved to better receive the palm of the user's hand, while a concaved upper portion 14a of the front housing half 14 is also concaved for better indexed finger placement and stability.

Figures 11, 12:
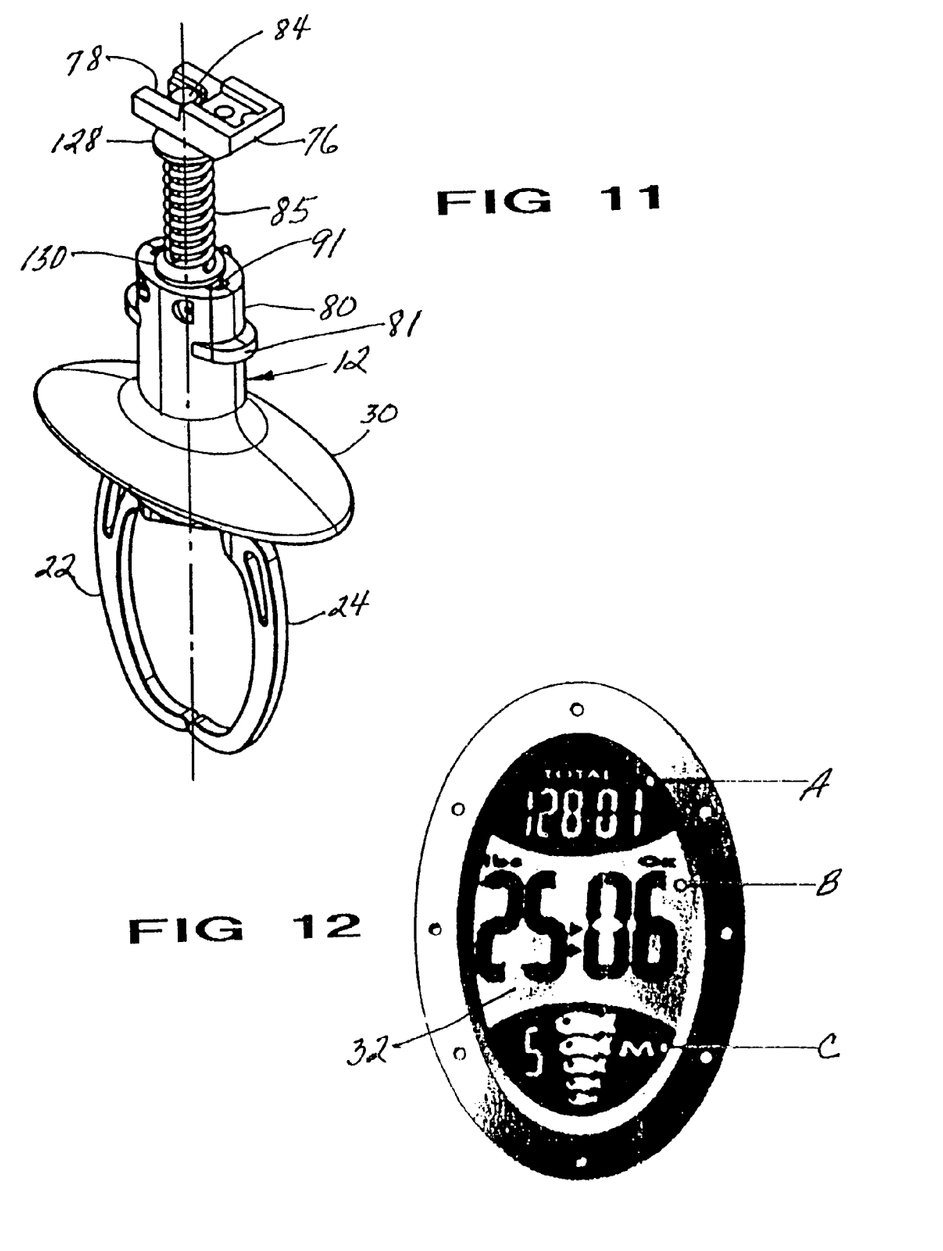
FIG. 11 is a perspective view of the fish-engaging assembly (12).
FIG. 12 is a front elevation view of the digital display screen of the invention.

Referring now to FIG. 12, a number of functions are provided by the electronic control circuit which is positioned on a main circuit board 62 in FIG. 9. The functions which are provided by this arrangement and digitally displayed at areas A, B and C of the digital display screen 32 are as follows:

weight of each fish storage of fish weight while the fish is being weighed sequentially weight ordering of up to "N" numbers of stored fish weights recall of all fish weights sequentially by weight override data currently stored cumulative total of stored weights weight limit exceeded The "override" function will automatically erase the smallest weight fish stored in the electronic circuit when the "N+1" fish is weighed. If the "N plus 1" fish is larger than the smallest of the currently stored fish weights, this smallest one will be erased and replaced with the weight of the "N plus 1" fish.

In order to protect the device 10 from physical harm, should an overweight fish which would damage the device, either structurally or internally, be placed between the jaws 22 and 24 and weighed, a series of dash lines will appear in the central portion B shown in FIG. 12 rather than a digital weight amount. The user is then immediately advised that the fish is too large to be lifted and weighed and should immediately be unloaded and removed from the jaws 22 and 24.

Referring particularly to FIGS. 9 and 10, the components of the invention 10 within the interior volume of the housing 11 formed of housing halves 14 and 16 includes the main circuit board 62 and liquid crystal display (LCD) 32 which forms the display screen of the invention. A molded button assembly includes the covers for control buttons 56, 58 and 60 while a separate molded button assembly includes the lower buttons 52 and 54, the operation of which was previously described.

A sealed bezel 50 attached around the digital screen 32 insures not only decorative continuity but also provides a watertight seal between the aperture formed in the housing halve 14 and the bezel 50.

The battery cover 20 is rotatably lockable within the mating aperture in the rear housing half 16. Again, the o-ring 118 provides a watertight seal between the battery cap 20 and rear housing 16.

Buoyancy

In the preferred embodiment, the invention 10 is buoyant without a fish being entrapped between the jaws 22 and 24. However, it is not intended that the device 10 remain buoyant or afloat should a large fish be locked within the closed jaws 22 and 24 and the device 10 be inadvertently dropped into the water.

To effect buoyancy, a STYRAFOAM molded member 114 is provided. As best seen in FIG. 10, the flotation member 114 is molded of closed-cell STYRAFOAM and the like is carefully configured to essentially fill all of the unoccupied interior volume between the housing halves 14 and 16. It has been determined that the sizing of the device as marketed will allow for this flotation member 114 to be approximately 5.2 cubic inches.

To further enhance buoyancy, a generally rectangular sealing member 66 is positioned against a mating surface of the interior of the front housing half 14 and against the perimeter of an intermediate housing portion 68 which is also formed of molded ASA plastic. A battery circuit board 64 with plug-in feature to circuit board 62 (not shown) is lockingly engagable within the cylindrical battery cap-receiving portion 69 of the intermediate housing portion 68. By this arrangement, a separate airtight volume is effected which, when combined with the STYRAFOAM flotation member 114, renders the device 10 substantially buoyant or floatable in either salt water or fresh water.

Percentage wise, it is estimated that the STYRAFOAM flotation member 114 provides approximately ¾or 75% of the buoyancy required, while the air chamber provides approximately one quarter or 25% of the buoyancy needed to maintain the device 10 in a floating condition.

To help insure the gripability of the device 10 in use, especially with heavier fish and wet hands, separate contoured panels 40, 42, 44 and 46 are provided which are attached to the corresponding outer contoured surfaces of each of the housing halves 14 and 16. These non-slip panels 40, 42, 44 and 46 are preferably formed of SANTOPRENE by an over molding process. The outer textured surface of these SANTOPRENE panels 40, 42, 44 and 46 provide a high level of non-skid gripping surface for enhanced control of the device. Alternately, spray elastomeric texturing may also be utilized for this purpose. Raised ribs add to gripability.

Referring now to FIGS. 9 and 11, the jaw actuating assembly 12 includes the opposingly oriented c-shaped jaws 22 and 24 formed of molded plastic or stamped metal, having the upwardly extending legs 22a and 24a, respectively. Holes 106 and 108 are formed at the upper end of each of these legs 24a and 22a, respectively. Each jaw 22 and 24 also includes an acutely shaped slot 98 and 100, respectively. An elongated u-shaped slotted jaw control member 86 is positioned between and substantially against each facing surfaces of the legs 24a and 22a, respectively, and includes an aperture 102 formed at the bottom thereof. Mating rivet halves 94 and 96 are lockingly engaged together through the aligned slots 98 and 100 and aperture 102 to slidably connect these three components together.

The molded jaw actuator 30 includes a longitudinal slot 91 formed therethrough which matably receives the jaw control member 86 which is rigidly held in position with the aperture 102. The lower end of the slotted spacer 86 extends downwardly from the bottom of the jaw actuator 30, held thusly by pins 90 which are secured in place through apertures 88 formed at the upper ends of each of the legs of the slotted spacer 86 and transverse holes 92 at the upper end of the cylindrical portion 80 of jaw actuator 30.

An elongated, straight longitudinally extending actuator shaft 82 slidably engages through the longitudinal aperture 91 and extends upwardly therefrom. An aperture 110 at the lower end of the actuator shaft 82 is pivotally connected by a pivot pin 104 through holes 106 and 108 formed adjacent the upper end of legs 24a and 22a, respectively. Thusly, actuator shaft 82 pivotally supports the jaws 22 and 24.

The upper end 84 of the actuator shaft 82 is snapingly engaged into a slot 78 formed into one end of a molded lower support 76 of a load cell 74. The two are attached together by a threaded fastener 122. A return spring 85 with washers 128 and 130 positioned at either end thereof are slidably engaged over the actuator shaft 82 prior to its engagement with the lower support 76.

Figure 13:
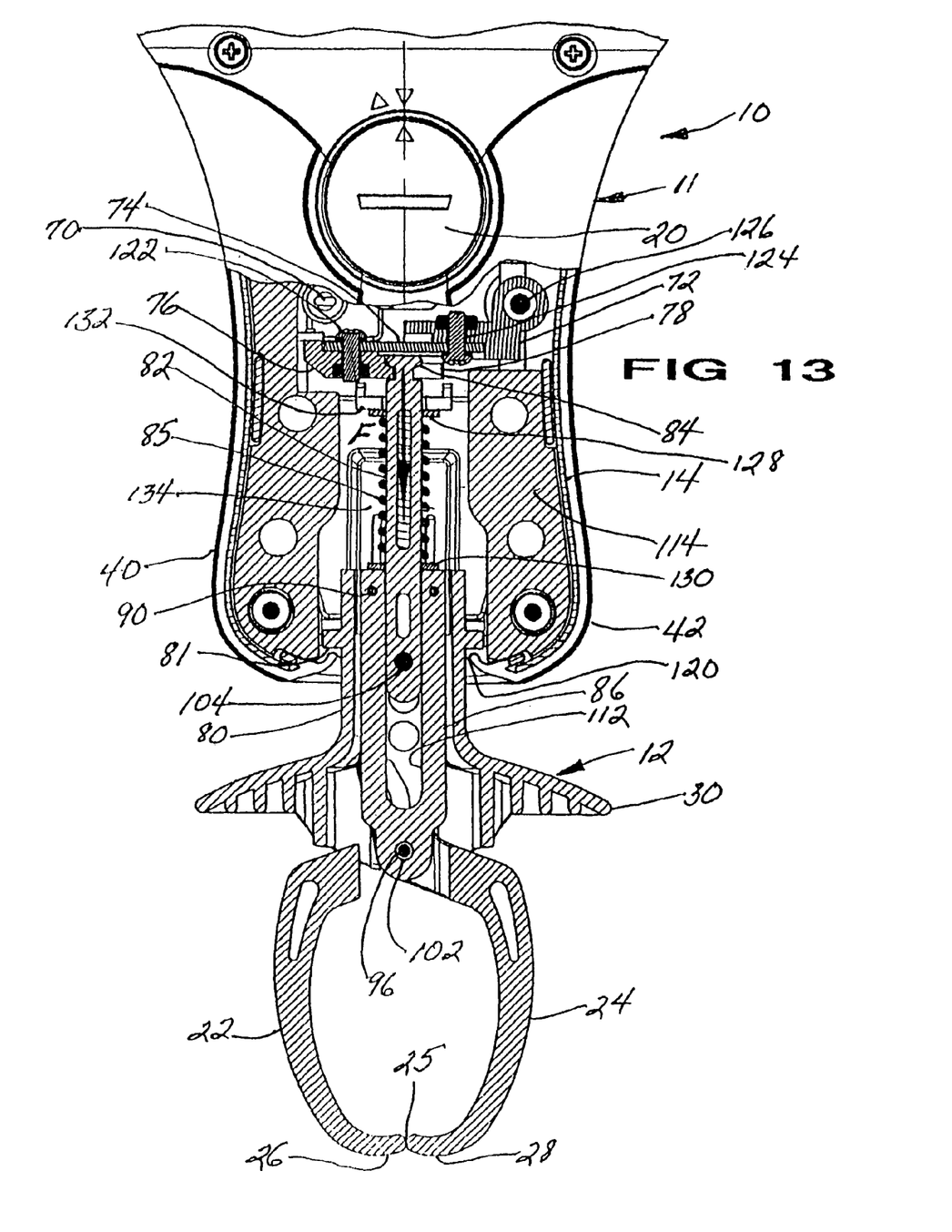
FIG. 13 is a rear elevation view of the invention in partial section with the jaws closed.
Figure 14:
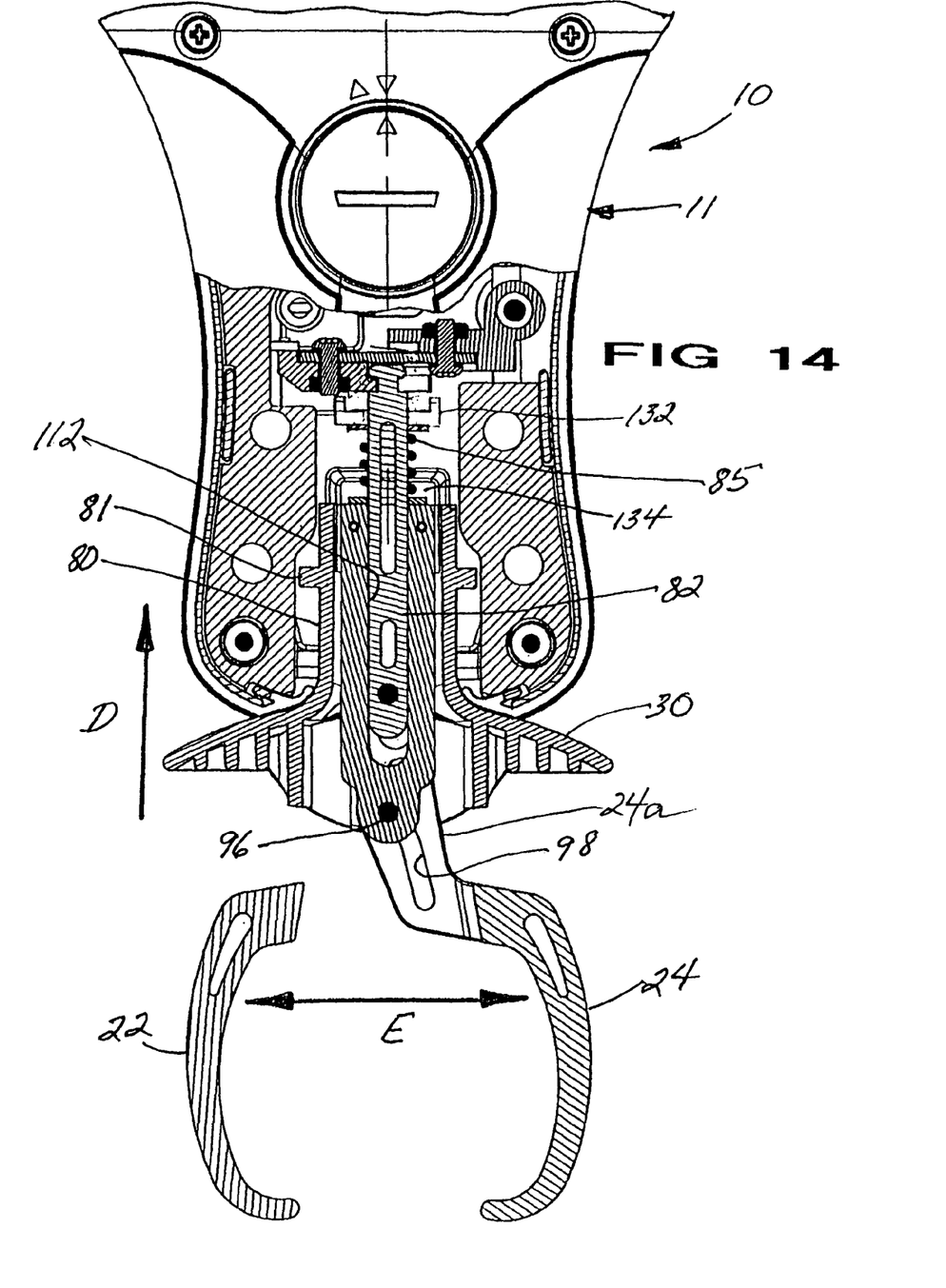
FIG. 14 is a rear elevation view similar to FIG. 13 with the jaws opened.
Figure 15:
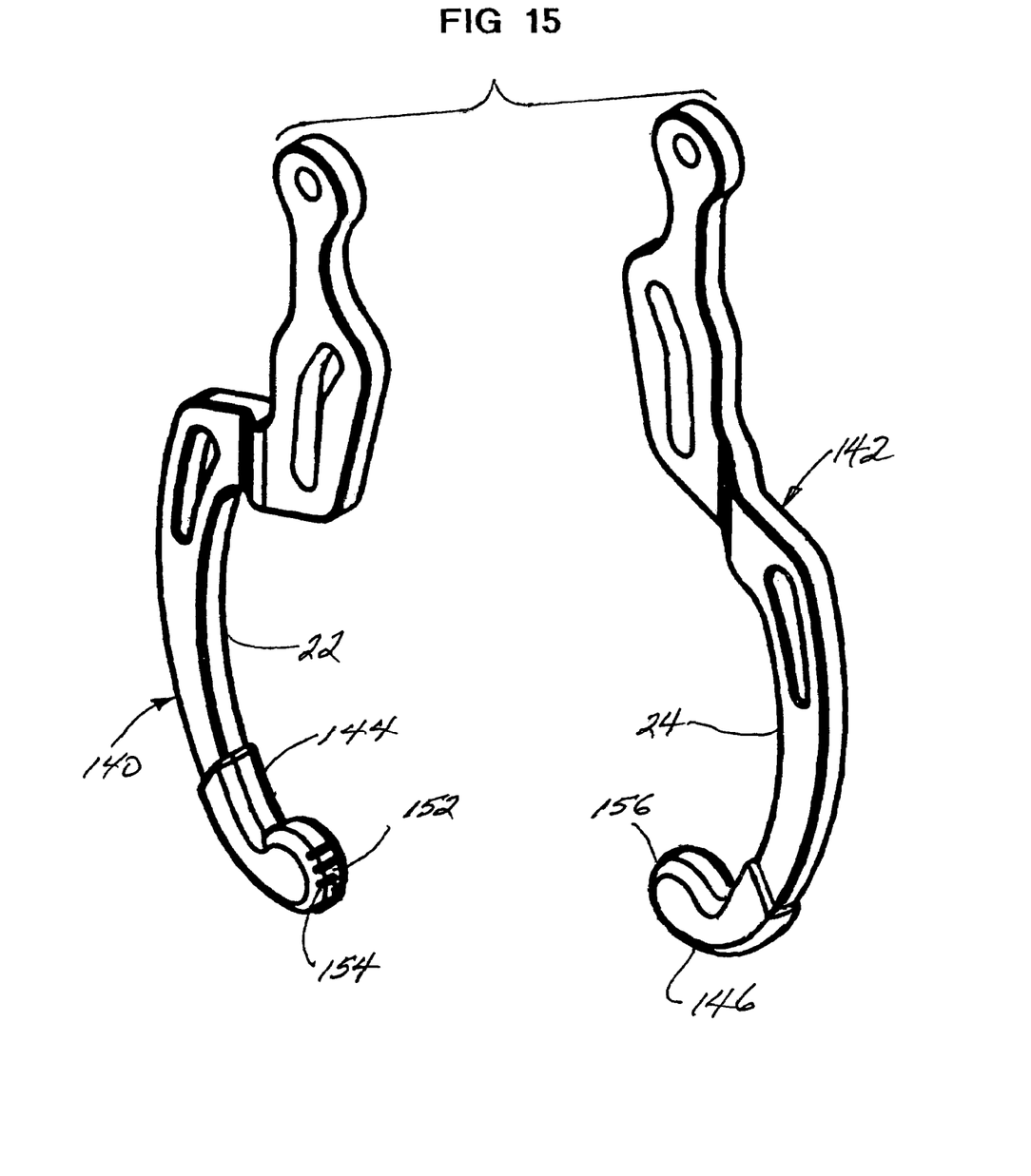
FIG. 15 is a perspective view of an improved and preferred embodiment of the jaws of this invention.
Figure 16:
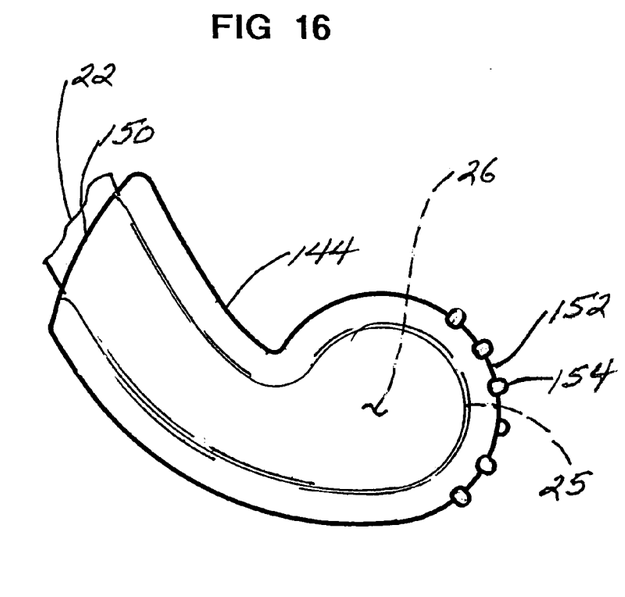
FIG. 16 is a side elevation view of one of the GRIP SOCKS mold formed around the distal end portion of each of the jaws.
Figure 17:
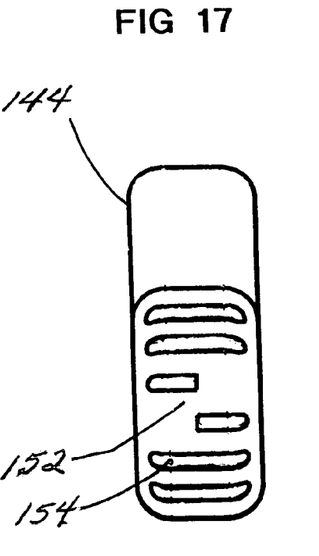
FIG. 17 is a side elevation view of FIG. 16.
Figure 18:
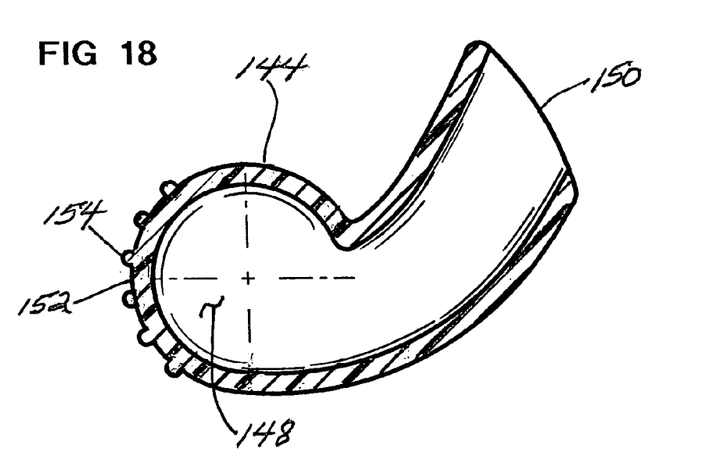
FIG. 18 is a longitudinal section view of FIG. 16.

Referring additionally to FIGS. 13 and 14, a molded upper load cell support 72 is secured by a mechanical fastener 126 to the intermediate housing portion 68. The corresponding end of the load cell 74 is secured by threaded fastener 124 to the lower surface of the upper load cell support 72. By this arrangement, a load placed between the jaws 22 and 24 will urge the actuator shaft 82 downwardly in the direction of arrow F, placing a load upon the load cell 74. The preferred embodiment of the load cell 74 is available from Sensor Base, P/N SB-1A.

The load cell 74 produces an electrical output signal into output wires (not shown for clarity) in proportion to the amount of weight in the direction of arrow F. The signal wires are fed through an aperture 70 formed through the intermediate housing portion 68 which is then sealed with silicone to insure that the airtight chamber remains watertight. The load signal is then fed into the main circuit board 62.

Operation

Still referring to FIGS. 13 and 14, the operation of the device 10 is there shown. In FIG. 13, the jaws 22 and 24 are in an at-rest position and closed with the distal portions 26 and 28 contacting one another at 25. It is during this orientation with the lower lip of a fish held between the closed jaws 22 and 24 that the downward force F equal to the weight of the fish is placed upon the load cell 74 as previously described. Note that the fish weight is translated to the load cell 74 through pivot pin 104 into the longitudinal actuator shaft 82.

The neck portion 80 of the jaw actuator 30 slidably moves within an aperture 120 formed in the bottom of the housing 11 itself. This neck portion 80 includes flanges 81 which prevent the jaw actuator 30 from being inadvertently dislodged from within the housing by the shoulders of aperture 120 as shown.

To open the jaws in the direction of arrow E in FIG. 14, the user merely grasps the main portion of the housing and then, either by thumb action or forefinger action, moves the jaw actuator 30 upwardly in the direction of arrow D. Because the pivot pin 104 is attached to the actuator shaft 82 which is anchored into the components of the load cell assembly, the jaws themselves 22 and 24 do not move upwardly. As a consequence, the rotation pin 96, which is anchored through aperture 102, is forced to slidably move along the diagonal slots 98 in each of the jaws 22 and 24. Note that the acute angle of these slots 98 is relatively shallow and in the range of approximately 14° to the longitudinal axis of the device. This is chosen so as to increase the mechanical leverage and smoothness of the upward motion in the direction of arrow D required of the jaw actuator 30. Polishing and smoothness of these slidably interacting surfaces is also preferred.

Also note that, when the jaw actuator 30 is released and forced downwardly into its at-rest position by return spring 85, the jaws 22 and 24 are automatically mechanically locked together to securely retain the lower lip of a fish which has been placed between the distal tips 26 and 28.

Referring now to FIGS. 15 to 18, the preferred embodiment of the jaws 22 and 24 is there shown generally at numeral 140 and 142. These jaws 140 and 142 are identical to jaws 22 and 24 as previously described with the addition of GRIP SOCKS or jaw tip covers 144 and 146 which are mold formed to cover the distal end portions 126 and 128 of each of the jaws 22 and 24, respectively. These GRIP SOCKS or jaw covers 144 and 146 are formed as an overmold using resilient AES SANTOPRENE having a textured finish per MOLD-TECH MT-1100 exterior surface finish requirements. When properly overmolded, these jaw protectors or covers 144 and 146 form a permanent bond with the jaws 22 and 24, respectively.

The jaw covers 144 and 146 each include distal end surfaces 152 (not shown with respect to grip cover 146) which, when biased together as previously described, press against and retain the lips and mouth of a fish being weighed. Molded ribs 154 which extend transversely across this distal surface 152 enhance gripability, in combination with the textured exterior surface of the jaw covers 144 and 146 to both enhance fish retention and to provide a level of reduced damage or harm caused by the gripping and weighing of a fish. The compressive or resilient nature of the overmolded plastic material forming each of the jaw covers 144 and 146 helps to accomplish this aspect of this preferred embodiment.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. For an electronic fish scale including a molded housing defining an interior volume and having upper and lower portions and adapted in exterior concaved side surface contour for supported hand grasping; an electronically controlled weight-sensing member mounted within said interior volume; a digital output screen extending over a portion of one said exterior side surface and electronically connected to said weight-sensing member; a fish-engaging assembly connected to and extending from said weight-sensing member through an aperture formed in said lower portion, said fish engaging member including a pair of opposed jaws each having a generally C-shape, a distal end of each of said jaws touching one another when said jaws are closed in an at-rest position; said fish-engaging assembly also including a longitudinal moveable jaw actuator which enables a user to engage and move said jaw actuator longitudinally by use of the finger or thumb, said jaw actuator spring biased downwardly when at rest to close said jaws into the at-rest position, said jaws being opened when said jaw actuator is manually moved upwardly into said housing; a lower lip of a fish positioned between opened said distal ends being securely held when said jaw actuator is released to close said jaws, whereupon a digital display of the weight of the fish is produced on said output screen when said fish scale is held to fully support the fish within said jaws, jaw tip covers comprising:
    a molded in place said jaw tip cover formed of resilient plastic and covering the distal portion of each of said jaws whereby fish lip gripability is increased while likelihood of harm to a fish being weighed is substantially reduced.

2. An electronic fish scale comprising:
    a molded housing formed of mating front and rear halves, said housing having upper and lower portions and adapted by exterior concaved side surfaces for hand grasping during use;
    an electronically controlled weight sensing member mounted within said interior volume and operably connected by a control circuit to a digital output screen, said output screen electronically connected by said control circuit to said weight-sensing member whereby a fish held by gravity downwardly from said weight-sensing member causes a digital numeric display on said output screen equal to the weight of the fish;
    a fish-engaging assembly extending downwardly through an aperture formed in said lower portion including a pair of opposed jaws each having a generally C-shape with an upwardly extending leg which is pivotally connected to a lower end of an elongated longitudinally extending actuator shaft, an upper end of said actuator shaft connected to said weight-sensing member, a lower distal end of each of said jaws touching one another when said jaws are in a closed at-rest position;
    each said jaw having an elongated longitudinally extending slot formed therethrough at a lower portion of said leg, each said slot having a portion thereof acutely angled with respect to a longitudinal axis of said housing, said slots being in alignment and registry and acutely oriented in opposite directions;
    said fish-engaging assembly also including a jaw actuator which, when manually moved upwardly into said housing, opens said jaws sufficiently to permit a lower lip of a fish to be positioned between opened said distal ends and being securely held thereby when said jaw actuator is released to close said jaws, whereupon a digital display of the weight of the fish is produced on said output screen when said fish scale is held to fully support the fish within said jaws;
    a molded in place jaw tip cover formed of resilient plastic and covering the distal portion of each of said jaws whereby fish lip gripability is increased while likelihood of harm to a fish being weighed is substantially reduced.

3. In an electronic fish scale including a molded housing defining an interior volume and having upper and lower portions and adapted in exterior concaved side surface contour for supported hand grasping; an electronically controlled weight-sensing member mounted within said interior volume; a digital output screen extending over a portion of one said exterior side surface and electronically connected to said weight-sensing member; a fish-engaging assembly connected to and extending from said weight-sensing member through an aperture formed in said lower portion, said fish engaging member including a pair of opposed jaws each having a generally C-shape, a distal end of each of said jaws touching one another when said jaws are closed in an at-rest position; said fish-engaging assembly also including a longitudinal moveable jaw actuator which enables a user to engage and move said jaw actuator longitudinally by use of the finger or thumb, said jaw actuator spring biased downwardly when at rest to close said jaws into the at-rest position, said jaws being opened when said jaw actuator is manually moved upwardly into said housing; a lower lip of a fish positioned between opened said distal ends being securely held when said jaw actuator is released to close said jaws, whereupon a digital display of the weight of the fish is produced on said output screen when said fish scale is held to fully support the fish within said jaws, the improvement comprising:
    a molded in place said jaw tip cover formed of resilient plastic and covering the distal portion of each of said jaws whereby fish lip gripability is increased while likelihood of harm to a fish being weighed is substantially reduced.

\* \* \* \* \*